Aug. 15, 1939.  F. A. WOOL  2,169,510
TENSION ROLLER DEVICE AND COMBINATION
Filed Oct. 22, 1938
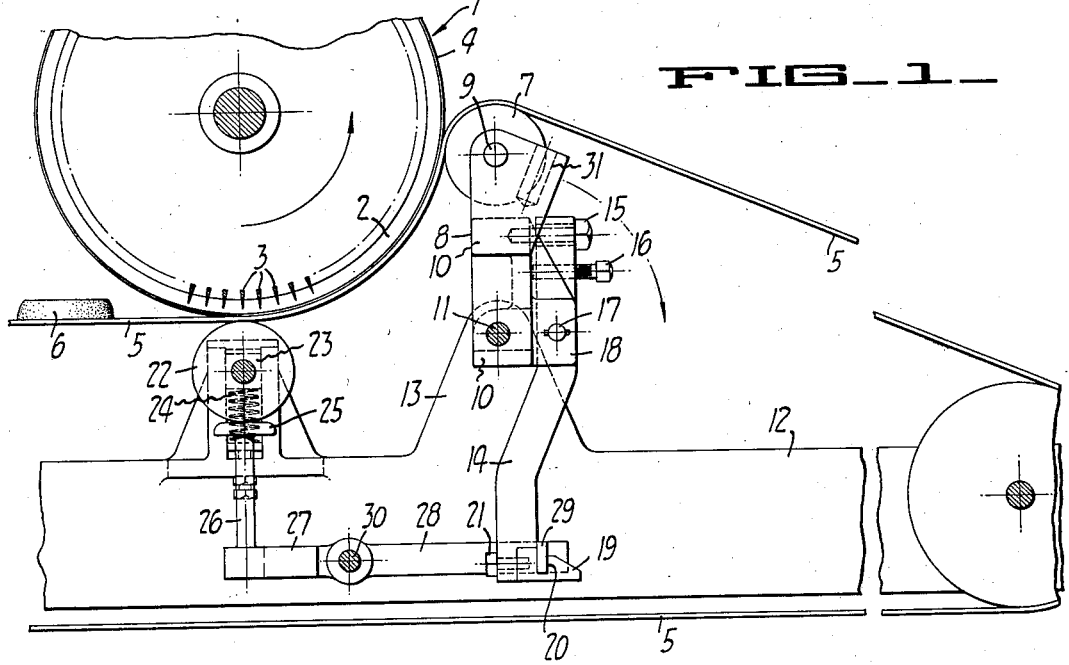
FIG_1_
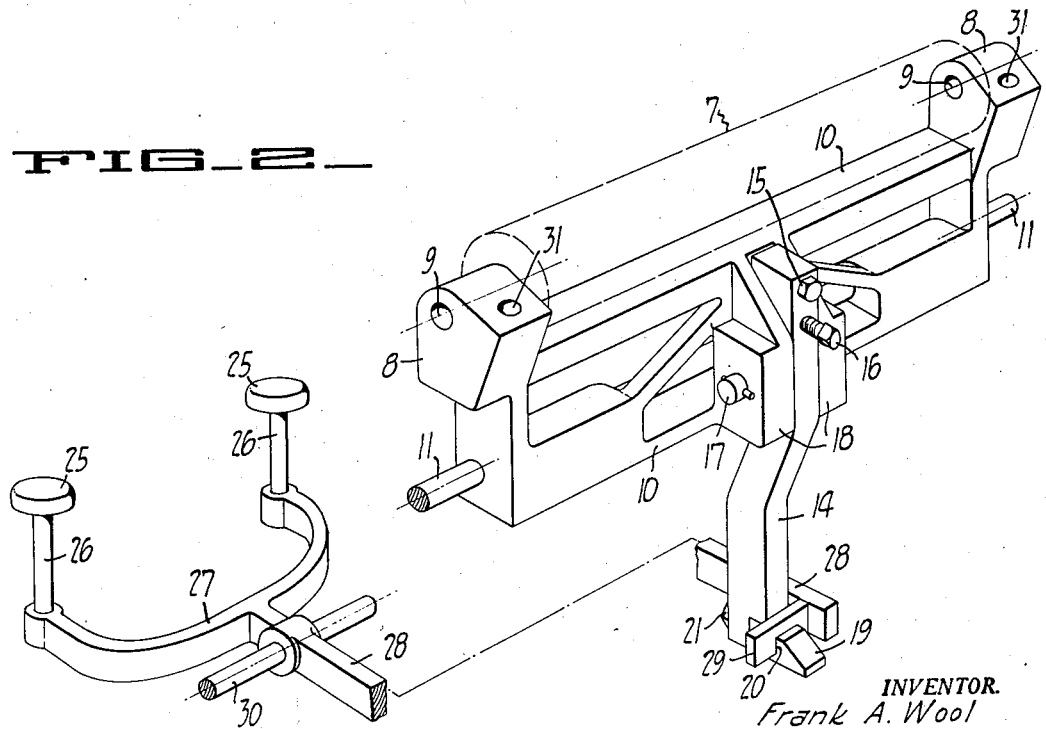
FIG_2_
INVENTOR.
Frank A. Wool
BY Boyken & Mohler
ATTORNEYS.

Patented Aug. 15, 1939

2,169,510

UNITED STATES PATENT OFFICE 2,169,510

TENSION ROLLER DEVICE AND COMBINATION

Frank A. Wool, San Jose, Calif.

Application October 22, 1938, Serial No. 236,477

8 Claims. (Cl. 146—89)

This invention relates to a tension roller release mechanism, and has for its objects improved means for quickly stopping the actuation of a rotary fruit dicing cutter upon a predetermined resistance to cutting by the cutting blades of such cutter for preventing injury to said cutter and for enabling an operator to remove the object offering such resistance, such as fruit pits, or any other foreign material of a harder consistency than the meat of the fruit. Another object is the aforesaid improved means in combination with a belt type conveyor and rotary cutter, in which the fruit is carried by the conveyor to the cutter for cutting thereby while the fruit is supported on the conveyor, and in which the cutter is driven by close frictional engagement between the cutter and the conveyor, the frictional driving engagement being maintained by a tension roller that comprises part of said means, and which stoppage of the belt is accomplished by a release of the tension roller, which release causes the conveyor to drop out of driving engagement with the cutter.

This invention is of generally the same nature as is disclosed in my copending application Serial No. 157,928, filed August 7, 1937, but is an improvement over the belt release means shown in said copending application, in that it is actuated upon the slightest resistance to cutting by the cutter greater than is required to cut the fruit irrespective of where such resistance occurs on the belt or conveyor at the time the fruit is cut; also, the present belt release means is more easily adjusted and the tension roller is more quickly restored to normal position than heretofore.

In the drawing, Fig. 1 is an elevational view of the invention with the tension roller in normal position. Some of the shafts are in section and the dicer or rotary cutter is semi-diagrammatically indicated.

Fig. 2 is a perspective view of the belt release mechanism apart from the rest of the structure, with the tension roller indicated in dotted line.

In detail, the rotary cutter for dicing the fruit is indicated at 1, which cutter is preferably of the same character as shown in my copending application Serial No. 203,070, filed April 20, 1938, the cutting blades themselves being as indicated in said copending application and which blades are more fully described in my copending application Serial No. 107,442, filed October 24, 1936. The cutter, in brief, comprises a horizontal row of axially aligned annular blades 2 supplied in equally spaced relation, and an annular row of equally spaced cross blades 3, which cross blades are supported at their opposite ends in annular rings 4, the rings 4 being provided with cylindrical bearing surfaces slightly projecting radially outwardly of the peripheral cutting edges of the annular blades, and the peripheral cutting edges of the annular blades projecting radially outwardly of the outer cutting edges of the cross blades. Said bearing surfaces are preferably roughened, as by knurling or milling, so as to provide a better frictional engagement with the surface of a conveyor belt 5 that is adapted to carry slices 6 of fruit to the cutting blades for dicing said slices.

The belt 5 extends substantially horizontally to the lower side of the rotary cutter, and then extends partially around the cutter in frictional driving engagement with the aforesaid roughened cylindrical bearing surfaces which are formed with or at least rigidly connected to the rings supporting the cutting blades. This frictional driving engagement is maintained by a tension roller 6 positioned relatively closely adjacent a lateral side of the rotary cutter, and positioned about a quarter of the distance around the cutter so as to maintain the belt in close engagement with the cutter for about said distance.

The roller 7 is rotatably supported between arms 8 of a generally vertically extending bracket, the roller shaft 9 being supported at its ends by said arms. The arms 8 are connected below the roller by a cross frame member 10 which projects below said arms, and which frame member is part of the supporting bracket. Said bracket is pivotally supported by horizontal shaft 11 on the main frame 12 and in bearings 13, said main frame being the one that supports the rotary cutter and conveyor.

A vertical arm 14 is secured at its upper end to said bracket member in a position centrally between the ends of the member by a clamping screw 15 that extends through an opening in the arm and is threaded at its outer end in a threaded opening in the bracket member. Below screw 15 is an adjusting set screw 16 that extends through a threaded opening in arm 14 and the outer end of which screw engages a side of the bracket member. Below set screw 16 the arm is pivotally connected to the bracket by means of a horizontal pivot 17 extending through ears 18 and through the upper end of arm 14, said ears being formed integrally with the bracket member.

The arrangement of the pivot 17 and screws 15, 16 with respect to roller, permits an angular adjustment between arm 14 and the bracket member that carries the roller, which adjustment is accomplished by loosening screw 15 and then turning screw 16 in either opposite direction, as desired, to increase or decrease the angular relation between the bracket and arm, after which screw 15 is tightened to secure the bracket and arm rigidly in the adjusted position.

At its lower end, the arm 14 carries a latch engaging member 19 offset to one side of the arm, which member is formed with a groove or notch 20 in its upper surface, the upper side of which member is beveled downwardly from adjacent the edge of the groove toward the outer end of the member. The said member is preferably of hardened steel and is removably secured to the arm by a bolt 21 connected therewith and extending through arm 14.

Below the belt 5 at the point where the conveyor belt first engages the rotary cutter before passing partially around the same to roller 7, and which point is where the fruit 6 first engages the cutting blades 2, 3, I provide a roller 22, the shaft of which roller is supported at its ends in bearing blocks 23 that yieldably urge roller 22 to a position against the belt 5 and said point by springs 24. Said roller is engaged at its ends, and on the side thereof opposite the belt, by members 25 which are carried at the ends of posts 26. The said posts are respectively supported rigidly on the outer ends of yoke arms 27, which yoke is formed with a leg 28 that carries a projection 29 that is adapted to fit within groove 20. A pivot shaft 30 pivotally supports the yoke and leg on frame 12 at a point intermediate the ends of the yoke arms and leg, which pivot is arranged to permit swinging of the members 25 on the yoke arms toward and away from roller 22 and to normally maintain the members 25 in contact with the roller.

In operation, when the tension roller is in a position supporting the belt under tension against the rotary cutter, as illustrated in Fig. 1, the projection 29 at the lower end of arm 14 is engaged in groove 20 in member 19 and the members 25 are in engagement with the roller 22. The springs 24 will normally hold roller 22 in belt supporting engagement in which position the belt is tight against the bearing surfaces 4 of the rotary cutter, and this position is maintained as long as only fruit is being fed to the cutter. However, in event any foreign material, such as a fruit pit or even part of a pit, or a sliver of wood or pebble, or any other such undesirable material engages the cutting blades by being carried by the belt 5 thereto, the belt 5 and roller 22 will be forced downwardly, causing projection 29 to move upwardly and the arm 14 to be disengaged from said member, thus allowing roller 7 to swing on pivot 11 in the direction of the arrow (Fig. 1) thus releasing the tension on belt 5, and the cutter and belt will immediately stop. The operator may then readily remove the foreign material, thus preventing the same from going past the cutter for canning and also preventing any possible injury to the cutting knives. After the foreign material has been removed, any suitable rod or the like may be inserted in openings 31 in the upper ends of arms 8 to provide sufficient leverage for swinging the roller 7 back to belt supporting position and the frictional driving engagement will be re-established between the rotary cutter and belt.

The provision of the members 25 at opposite ends of roller 22 is to take care of actuating the locking or latching elements, as described, for releasing the roller 7, irrespective of where such foreign material may be on the belt.

The aforesaid belt release mechanism is very sensitive and also provides for the quick resetting of roller 7 after the roller has been swung to belt releasing position. These features are of vital importance in the canning industry, where breakage of machinery or time of stoppage of any of the apparatus must be reduced to the minimum in order to avoid economic disaster.

Having described my invention, I claim:

1. In fruit dicing apparatus, including a rotary cutter having peripheral, radially outwardly directed cutting edges for cutting fruit presented thereto, a conveyor belt for fruit to be cut, belt supporting means in a position holding a portion of said belt under tension with said portion relatively close to said cutting edges for cutting of fruit on said portion by said edges and movable to a second position releasing the tension on said portion, movable means engaging said portion actuated for movement only upon a predetermined pressure on said portion by reason of engagement of foreign material on said portion having greater resistance to cutting by said edges than the flesh of the fruit thereon, and means operatively connecting between said movable means and said belt supporting means actuated by movement of said movable means for causing movement of said belt supporting means to said second position.

2. In a construction as defined in claim 1, said belt supporting means including a roller engaging said belt, said movable means including a member engaging said belt adjacent the initial point of engagement between fruit on said conveyor and said edges during movement of the conveyor for carrying fruit to said edges.

3. In a construction as defined in claim 1, said movable means including a roller engaging said portion at a point adjacent said cutter mounted at its ends for yieldable movement in a direction toward and away from said cutter and a latch element pivoted at a point intermediate its opposite ends with one end engaging said roller in a position for swinging of the opposite end of the element upon movement of the roller in direction away from said cutter, and means actuated by swinging of said opposite end releasing said roller for movement to said second position.

4. In combination, a rotary fruit cutter provided with cylindrically aligned peripheral cutting edges arranged and adapted to cut fruit presented to said edges into dices upon rotation of said cutter, a fruit conveyor belt for supporting fruit on a side thereof and positioned relative to said cutter for carrying the fruit so supported to said cutter for dicing thereby, a roller in a position supporting a portion of said belt under tension with the fruit supporting surface thereof in frictional driving engagement with a peripheral side of said cutter for rotating the cutter upon movement of the belt in direction for carrying the fruit to said cutter, roller supporting means releasably supporting said roller in said position for movement thereof to a second position in which the tension on the belt and the frictional driving engagement between the belt and cutter is released, a member in engagement with said belt adjacent the point of initial engagement between fruit adapted to be supported on said belt and said cutter when the belt is moved to carry said fruit to the cutter, means yieldably mounting said member for movement outwardly of the cutter only upon a predetermined pressure against said belt than is effected by the normal force required for cutting fruit on said belt by the cutter at said point, and roller actuating means operably connected between said member and said roller supporting means actuated by said movement of said member for releasing said roller supporting means for movement of the roller to said second position.

5. In a construction as defined in claim 4, said member comprising a roller supporting said belt at said point.

6. In a construction as defined in claim 4, said roller actuating means including releasably connected interlocking latch members respectively connecting with said member and said roller supporting means.

7. In a construction as defined in claim 4, said roller supporting means comprising a bracket mounting said roller and a pivot swingingly mounting said bracket for carrying said roller in an arc to said second position, and a latch member releasably connecting between said bracket and said member for releasably holding said roller supporting means in a position with the said roller in the first mentioned position.

8. In combination with an endless belt having a generally horizontally extending upper run adapted to support fruit thereon for movement therewith in one direction upon movement of said run in said direction, a pair of spaced rollers adapted to engage the under side of said upper run at spaced points for movement of the belt thereover, means yieldably mounting one of said rollers in a position in engagement with the under side of said upper run at a point in the length of said upper run for generally vertical movement in opposite directions upon such movement of said upper run at said point, means mounting the other roller of said pair for movement from one position, supporting the portions of the belt extending from opposite sides thereof under tension to a second position releasing said tension, releasable locking means holding said other roller in said one position actuated by movement of said one of said rollers to release the locking means for permitting movement of said other roller to said second position, and a fruit cutter positioned over said upper run and over said one of said rollers having cutting edges movable generally toward fruit on said upper run for cutting fruit thereon, and said other roller being arranged and adapted to hold said upper run under a tension sufficent to resist substantial movement of said belt away from the cutter during cutting of the fruit thereon while permitting said movement upon pits or other material on said belt of greater resistance to cutting than said fruit being engaged by said edges.

FRANK A. WOOL.